United States Patent [19]

Frey et al.

[11] 4,105,226
[45] Aug. 8, 1978

[54] SNAP-IN FITTINGS AND COUPLING RING THEREFOR

[75] Inventors: William J. Frey; Paul L. Meyer, both of Louisville, Ky.

[73] Assignee: Celanese Corporation, New York, N.Y.

[21] Appl. No.: 763,588

[22] Filed: Jan. 28, 1977

Related U.S. Application Data

[63] Continuation-in-part of Ser. No. 691,756, Jun. 1, 1976, abandoned.

[51] Int. Cl.² ............................................ F16L 39/00
[52] U.S. Cl. ................................... 285/175; 285/179; 285/319; 285/321; 285/354
[58] Field of Search ............... 285/321, 141, 276, 340, 285/104, 105, 277, 423, 308, 354, 319, 175, 179

[56] References Cited

U.S. PATENT DOCUMENTS

| 738,503 | 9/1903 | Waters | 285/276 X |
|---|---|---|---|
| 3,398,977 | 8/1968 | Yoneda | 285/321 X |
| 3,447,819 | 6/1969 | Borsum et al. | 285/321 X |
| 3,532,367 | 10/1970 | Roos | 285/321 X |
| 3,540,760 | 11/1970 | Miller et al. | 285/321 |
| 3,731,955 | 5/1973 | Borsum | 285/321 X |
| 3,773,360 | 11/1973 | Timbers | 285/321 X |
| 3,957,295 | 5/1976 | Gould | 285/342 |

FOREIGN PATENT DOCUMENTS

| 1,029,123 | 5/1966 | United Kingdom | 285/340 |
|---|---|---|---|
| 1,118,384 | 7/1968 | United Kingdom | 285/340 |

*Primary Examiner*—Dave W. Arola

[57] ABSTRACT

A snap-in fitting includes male and female connector elements which are connectable to fluid conduits. The male connector element is insertable within a socket of the female connector element and is retained therein by a coupling ring. The coupling ring includes an integral base portion, collar portion and locking portion. The collar portion is seated within a retaining channel of the male connector element, and the locking portion lockingly abuts within a locking groove of the socket. The collar portion includes annular surfaces which converge from the base portion. The locking portion extends outwardly at an angle from the base portion and includes annular surfaces which diverge from the base portion. An undercut is formed at the juncture of the locking portion with the base portion, to maintain the pivot point of the locking portion adjacent such juncture. An O-ring mounted on the male connector element sealingly engages a wall of the socket. The configuration of the locking ring assures that inward and outward pivoting of the locking portion during merging of the male and female connctor elements occurs at the region where the locking portion joints the base portion. This enhances maximum radial entry of the locking member into the locking groove even when the ring is formed of relatively stiff material. The female connector element includes an adapter portion and a retaining sleeve portion which are threadedly secured together, and which each include means cooperating to define the sleeve and locking groove of the socket. By decoupling the adapter and retaining sleeve the connection can be disassembled without removing the female connector element from its associated fluid conduit.

17 Claims, 7 Drawing Figures

SNAP-IN FITTINGS AND COUPLING RING THEREFOR

RELATED APPLICATION

This is continuation-in-part of U.S. application Ser. No. 691,756, filed Jun. 1, 1976 and now abandoned.

BACKGROUND AND OBJECTS

This invention relates to flow line connections and more particularly to a fitting for intercoupling fluid conduits.

Couplings have heretofore been proposed for providing connections between fluid conduits, as exemplified in Waters U.S. Pat. No. 738,503, issued Sept. 8, 1903, Leadbetter U.S. Pat. No. 2,831,711, issued Apr. 22, 1958, Noll U.S. Pat. No. ,529,098, issued Nov. 7, 1950 and Roos U.S. Pat. No. 3,532,367, issued Oct. 6, 1970. Couplings such as these involve the use of a flow line having male and female connector elements. Connection between the male and female elements can be accomplished by a coupling ring. The coupling ring typically includes an annular base which sits within a channel formed in the male or female member, and an annular locking leg which extends outwardly at an angle from the base. During insertion of the male element into the female element, the locking leg is compressed and eventually springs outwardly into locking engagement with a locking recess in the other element to prevent separation of the male and female elements. An O-ring seal may be interposed between the elements to provide a fluid seal.

Snap-in couplings of this type can be quickly and easily assembled without the need for special tools. The present invention contemplates the use of this type of coupling in a fitting for vehicle brake systems to obtain a dependably secure connection with a coupling ring sufficiently flexible to facilitate axial convergence of the male and female elements.

The present invention also envisions a coupling of this type which can be easily disassembled without completely removing the female connector element from its associated fluid conduit.

It is a general object of the present invention to provide a novel tube fitting for air brake systems or the like.

It is a further object of the present invention to provide a novel snap-in coupling which is easily assembled to provide a reliably strong connection.

It is another object of the invention to provide a coupling ring for use in a novel snap-in coupling joint which facilitates the initial coupling action while being highly resistant toward uncoupling forces.

It is a further object of the invention to provide a novel snap-in coupling which is easily disassembled without requiring complete removal of the female element from its associated fluid conduit.

BRIEF SUMMARY OF PREFERRED EMBODIMENT OF THE INVENTION

These objects are achieved by a fitting according to a preferred form of the present invention comprising a coupling ring and male and female connector elements. One of the connector elements includes a ring-retaining channel and the other of the connector elements includes a locking groove. The coupling ring comprises an annular base portion including an annular first axially extending wall, an annular second axially extending wall spaced radially from the first wall, and an annular radial end wall interconnecting adjacent ends of the first and second walls. An annular collar portion is integral with the base portion and extends from a side of the base portion opposite the end wall. The collar portion includes an annular axially extending first wall adapted to seat in the retaining channel of one of the connector elements, and an annular second wall spaced radially therefrom. The second annular wall of the collar portion is contiguous with the second axially extending wall of the base portion. The first wall of the collar portion is spaced radially from the plane of the first wall of the base portion and is generally frustoconically configured to converge toward the seating surface in a direction away from the base portion. An annular locking portion, also integral with the base portion, extends from a side of the base portion opposite the end wall. The locking portion is of longer length than the collar portion and includes: an annular first, generally frustoconical wall, an annular second, generally frustoconical wall spaced radially therefrom, and an annular radial terminal wall interconnecting the second and first walls of the locking portion. The second wall of the locking portion extends from the base portion toward the terminal wall at an acute angle relative to the second wall of the collar portion to form a vertex therewith at the base. The terminal wall is adapted to lockingly abut within the locking groove. The first wall of the locking portion is contiguous with, and extends at an angle from, the first wall of the base portion and is divergent relative to the second wall of the locking portion in a direction away from the base portion. The vertex is disposed closer to the end wall of the base portion than is the place of intersection of the first walls of the base and locking portions. The locking portion includes a plurality of circumferentially spaced resiliency slots extending therethrough. One of the slots extends completely through the ring to facilitate mounting thereof on the element carrying the retaining groove.

The female connector element may be of one unitary piece or it may comprise an adapter portion and a retaining sleeve portion detachably secured thereto. The adapter portion includes a first socket portion having a first circumferentially extending groove portion. The retaining sleeve portion includes a second socket portion which is aligned with the first socket portion and which has a second groove portion aligned with the first groove portion to define the locking groove for receiving the locking portion. The retaining sleeve portion and the adapter portion are separable to disassemble the fitting and expose the coupling ring.

THE DRAWINGS

Other objects and advantages of the present invention will become apparent from the subsequent detailed description of a preferred form thereof in connection with the accompanying drawings in which like numerals designate like elements and in which.

DETAILED DESCRIPTION OF PREFERRED EMBODIMENT

Figure 3:
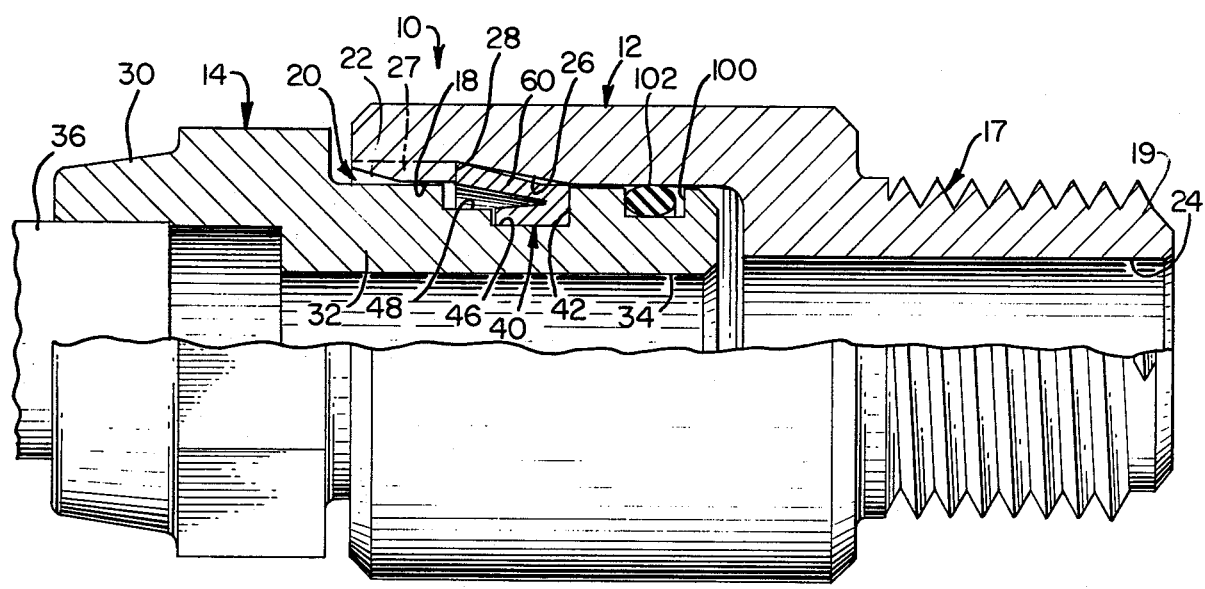
FIG. 3 is a side elevational view of the coupling ring disposed within a snap-in fitting according to the present invention, with a portion of the fitting being broken away in longitudinal section.

A preferred snap-in fitting 10 according to the present invention is depicted in FIG. 3 and includes a female connector element 12 and a male connector element 14. The illustrated female connector element 12 includes an enlarged socket 20. Projecting from the female connector 12 and preferably molded integrally therewith is an additional male connector 17. These two connector elements 12 and 17 can be molded in one piece of a thermoplastic material, preferably nylon, although other materials are equally suitable.

The axially extending, outwardly open socket 20 is defined by an internal wall 18 of the female connector 12, which wall terminates in an outwardly flared edge 22. The illustrated male connector 17 projecting from the base of the female connector 12 and axially aligned with the socket 20 comprises an externally threaded nipple 19. This nipple 19 is adapted for terminal connection to a fluid conduit, such as the air inlet of a vehicle air brake mechanism. A through-passage 24 is formed in the nipple 19 to communicate with the socket 20.

It will be appreciated that in some instances the additional male connector 17 associated with the female connector 12 may instead be a member essentially identical to the illustrated male connector 14 that mates with the female 12. In such cases the passage through the additional male connector 17 will ordinarily be oriented at an angle (e.g., 90°) to the axis of the socket 20 and a suitable transition passage will connect the two. The additional male connector 17, when it takes the form of the illustrated male connector 14, could in turn be mated to a socket such as the one shown at 20 which is integral with an aligned nipple such as the one shown at 19. In this fashion, suitable flexibility for 90° turns and the like is provided at a terminal connection.

It will also be appreciated that the present invention contemplates in-line couplings of tubes and the like to one another, as well as terminal connections. In such instances a double ended female member having sockets 20 facing outwardly at both ends may be employed. Each such socket 20 will mate with the basic male connector 14 as discussed more fully below.

A radially inwardly open, annular locking groove 26 is formed in the socket wall 18. This locking groove 26 extends circumferentially around the wall 18 and has a generally radial abutment wall or shoulder 28 located at an outer end of the groove, i.e., at an end of the groove nearest the open end of the socket. The locking groove 26 may be machined in the molded female connector 12 and the shoulder 28 may be circumferentially continuous. However, the groove 26 may be molded in place, in which event, circumferentially spaced and longitudinally extending tool access and removal slots (as illustrated in phantom at 27) would be provided by a compatibly configured, collapsible or retractable multipiece molding core (not shown). The slots would, of course, be separated by lands so that a discontinuous shoulder 28 would be present at the outer end of the locking groove 26.

The male connector element 14 comprises a tubular spigot portion 32. Associated therewith is an oppositely facing, socketed section 30. These two members 30 and 32 are preferably of one-piece construction, and can be molded of the same material as the female connector 12 and its associated male connector 17. The socket 30 can be suitably coupled, as by welding or other bonding technique, to a fluid conduit such as a nylon air hose or tube (schematically shown at 36) used in a vehicle air brake system. The spigot 32 includes a passage 34 which communicates with the socket 30 and is in general axial alignment with the socket 20 of the female connector 12 when the connectors 12, 14 have been merged.

An annular, circumferentially arranged retaining channel 40, which is radially outwardly open, is provided on the outer wall of the spigot 32. When the male and female connectos 14 and 12 have been merged, the retaining channel 40 is disposed in oppositely facing relation to the locking groove 26. The retaining channel 40 includes a radially extending, axially facing side wall 42 which is located axially inwardly of the abutment wall 28, i.e., toward the internal end of the socket 20. The channel 40 also includes a stepped bottom wall preferably formed by radially stepped inner and outer surfaces 46, 48, respectively.

A coupling ring 60 is insertable within the retaining channel 40 to connect the male and female elements together. The coupling ring is preferably formed of a relatively stiff material so as to maximize the strength of the connection afforded thereby. The relative stiffness of this material employed to provide an adequately strong coupling, renders it somewhat resistant to the compressive action which must occur during merging of the male and female elements. The coupling ring 60 has, however, been made sufficiently flexible and resilient to facilitate initial connection of the elements, without impairing the reliability of the connection, as will now be discussed.

In its preferred form the coupling ring 60 includes an annular base portion 62, an annular collar portion 64, and an annular locking portion 66. The coupling ring 60 is of one-piece construction, so that the base, collar and locking portions 62, 64, 66 are integral. For example, when utilized in a critical area where a high degree of reliability is required, the ring can be molded of a relatively stiff nylon such as nylon 11 or of other thermoplastic materials whose stiffness is sufficient to provide a strong, reliable connection while being sufficiently resilient to accommodate the coupling action described below. It is also envisioned that some metals, for example spring steel, stainless steel or brass, may provide these characteristics.

Preferably when the ring 60 is constructed of thermoplastic (which may, if desired, be reinforced in some instances with materials such as fiber glass fillings) and employed in a fitting for air brake tubes or other severe pressure applications, the material of the ring has a flexure modulus at about room temperature in the range of about $0.7 \times 10^5$ psi to $8 \times 10^5$ psi as determined by ASTM test D-790, and a compressive strength at about room temperature of between about 2,000 psi to 22,000 psi as determined by ASTM test D-695. A variety of appropriately dimensioned thermoplastics such as polyethylene, PVC, CPVC, polypropylene and polystyrene materials, as well as the aforementioned nylon materials, are contemplated in this regard. When the ring is constructed of thermoplastic and employed in less severe pressure applications such as in fittings for instrumentation systems, the lower end of the aforementioned flexure modulus range may be about $0.08 \times 10^5$ psi.

The base portion 62 of the ring 60 includes an annular, axially extending outer wall 68, an annular, axially extending inner wall 70 spaced radially inwardly therefrom, and an annular radial wall 72 which interconnects adjacent ends of the outer and inner walls 68, 70. When the elements 12, 14 are interjoined, the radial wall 72 abuts against the side wall 42 of the retaining channel 40, as depicted in FIG. 3.

The collar portion 64 extends from a side of the base portion 62 which is opposite the end wall 72 and extends in a direction generally parallel to the axis of the coupling assembly. This collar 64 includes an annular axially extending inner wall 74 and an annular outer wall 76 spaced radially therefrom. The inner wall 74 of the collar portion 64 defines a cylindrical seating surface which seats snugly within the retaining channel 40. A snug fit is assured since the diameter of the inner surface 74, in its free state, is slightly smaller than that of portion 46 of the retaining channel 40. The inner wall 74 of the collar portion 64 is contiguous with the inner surface 70 of the base portion 62. Moreover, these inner surfaces are preferably aligned, in which case the inner surface 70 of the base portion 62 forms part of the seating surface.

The outer wall 76 of the collar portion 64 is disposed radially inwardly of the plane of the outer wall 68 of the base portion 62. This outer wall 76 of the collar portion is generally frustoconical so as to converge toward the inner wall 74 in a direction away from the base portion 62.

The locking portion 66 extends from a side of the base portion 62 opposite the end wall 72, i.e., from the same side as the collar portion 64. The length of the locking portion 66 is greater than that of the collar portion 64. The locking portion 66 includes an annular generally frustoconical inner wall 82, an annular generally frustoconical outer wall 84 and an annular, radial terminal wall 86 which interconnects adjacent ends of the inner and outer walls 82, 84.

The inner wall 82 of the locking portion 66 extends from the base portion toward the terminal wall 86 at an acute angle relative to the outer wall 76 of the collar portion 64 to form a vertex V therewith.

The terminal wall 86 of the locking portion 66 is disposed radially outwardly of the plane of the outer wall 68 of the base portion 62 in the uncompressed state of the ring 60.

When the elements 12, 14 have been merged, the terminal wall 86 lockingly abuts against the abutment wall 28 of the locking groove 26 to resist axial detachment of the male and female elements, as depicted in FIG. 3.

The outer wall 84 of the locking portion 66 is contiguous with, and extends at an angle from, the outer wall 68 of the base portion 62. This outer wall 84 diverges relative to the inner wall 82 in a direction away from the base portion 62. Thus, the thickness of the locking portion 66 is smallest at the place where it joins the base portion 62, and is largest at the place where it abuts against the abutment wall 28, for reasons to be discussed.

The distance $d$ from the end wall 72 of the base portion 62 to the vertex V is less than the distance $d'$ from the end wall 72 to the place P where the outer walls 84, 68 intersect. Thus, the place of intersection P terminates beyond the vertex V considered in a direction away from the end wall 72.

In order to render the locking portion 66 of sufficient resiliency to compress radially during mating of the elements 12, 14, the locking portion 66 is provided with a plurality of circumferentially spaced resiliency slots 90. As can be viewed in FIGS. 1 and 2, the slots 90A, B extend completely through the locking portion 66 and partially through the base portion 62, i.e., through the radially outer half of the latter. Any number of such slots 90 may be provided, although three such slots are preferred, spaced 120° apart. One slot 90C of these slots extends completely through the coupling ring, that is, completely through the base, collar and locking portions 62, 64, 66. The coupling ring 60 is thus split to facilitate insertion onto the male element 14.

Disposed within the spigot 32 forwardly of the retaining groove 40 is an annular circumferential recess 100 which is radially outwardly open. This recess 100 carries an annular sealing ring 102, preferably in the form of an elastomeric O-ring. When the male and female connector elements 14, 12 are interjoined, the O-ring 102 is compressively engaged with the socket wall 18 to provide a fluid seal.

A first step in interjoining the male and female elements 12, 14 involves inserting the coupling ring 60 onto the spigot portion 32 of the male member 14 by separating the ring portions in the vicinity of the slot 90C. The ring 60 is inserted into the retaining channel 40 such that the seating surface is snugly seated upon the wall portion 46 of the retaining channel 40.

The spigot 32 of the male element 14 and the socket 20 of the female element 12 are then merged axially so that the locking portion 66 engages the flared edge 22 of the socket portion and is pivoted radially inwardly about the region P. During continued merging of the connector elements 12, 14, the locking portion 66 is held in a compressed state against the outer wall 76 of the collar portion 64 as a result of contact with the socket wall 18. When the elements 12, 14 have been merged sufficiently so that the terminal wall 86 of the locking portion passes the abutment wall 28 of the locking groove, the locking portion 66 swings outwardly about the region P and into the locking groove 26. In this condition, detachment of the male and female elements is restrained by the physical abutment between the terminal wall 86 of the coupling ring 60 and the abutment wall 28 of the locking groove 26.

This coupling operation is greatly facilitated by certain features of the coupling ring. For example, since the cross-sectional thickness of the locking portion 66 is smallest at region P, it is assured that, despite the relative stiffness of the ring 60, inward pivoting of the locking portion 66 will occur at about the region P, rather than at a point closer to the terminal wall 86. Accordingly, subsequent outward pivoting of the locking portion into the locking groove will also occur about the region P, guaranteeing maximum radial entry of the terminal wall 86 into the locking groove 26.

Moreover, the vertex V, in being disposed closer to the end wall 72 than the region P, forms an undercut of the region P which further tends to locate the pivot zone of the locking portion 66 closely adjacent the base portion 62.

These factors thus serve to maximize the pivot arc of the locking portion 66 and assure that substantially the entire length and cross section of the locking portion will be available to resist forces tending to uncouple the connector elements 12, 14. Also, the reduced thickness of the locking portion at the region P makes it possible to compress the locking member with less effort, thereby making it considerably easier to merge the elements 12, 14.

The converging relationship of the upper wall 76 of the collar portion 64 relative to the inner surface 74 assures that ample area between the surfaces 76, 82 of the collar and locking portions will be available to receive the compressed locking portion 66 during a merging operation. Thus, there is little danger of the ring 60 becoming jammed in the socket short of its locking position.

Figure 4:
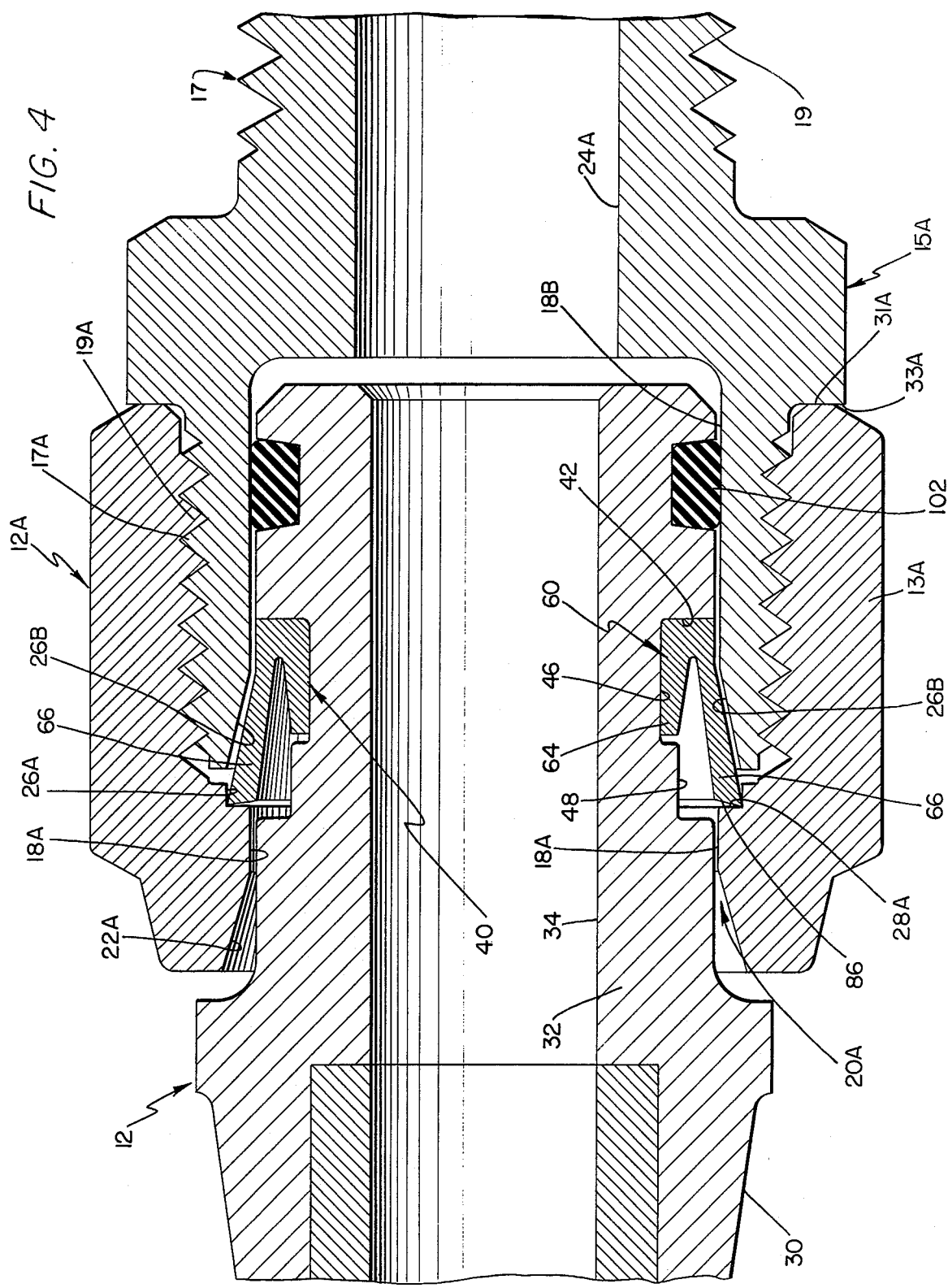
FIG. 4 is a side elevational view of a modified form of snap-in fitting according to the invention, with a portion of the fitting being broken away in longitudinal section.

In a second preferred embodiment of the invention, illustrated in FIG. 4, the female connector element 12A comprises a retaining sleeve portion 13A and an adapter portion 15A. The adapter portion 15A includes a male connector 17 comprising a threaded nipple 19 and a through-passage 24A.

Connection of the retaining sleeve 13A to the adapter 15A is effected by merging internal threading 17A on the retaining sleeve 13A with external threading 21A on the adapter 15A.

The retaining sleeve 13A and the adapter 15A togehter define a socket 20A for receiving the male connector element 14. The socket wall is formed by axially aligned bores 18A, 18B in the retaining sleeve 13A and the adapter 15A, respectively. The bore 18A terminates in a flared edge 22A.

The retaining sleeve 13A and the adapter 15A include aligned circumferential grooves 26A, 26B, respectively, which cooperate to form a locking groove for receipt of the annular locking portion 66 of the coupling ring 60. The groove 26A of the retaining sleeve 13A includes a radial abutment shoulder 28A located at an outer end thereof.

The dimension of the retaining sleeve from the abutment shoulder 28A to an inner end 31A is sized so that when the end 31A contacts a stop surface 33A of the adapter 15A, the shoulder 28A is situated substantially at a location coinciding with the outer end 86 of the locking arm 66 of the coupling ring.

It will be appreciated that the retaining sleeve 13A and the adapter 15A together form structure which is similar in arrangement and function to that described in conjunction with the first preferred embodiment in that a socket 20A in the female connector element 12A receives the spigot 32 of the male element 14, so that the locking portion 66 of the coupling ring 60 is initially compressed by contact with the flared edge 22A and then swings outwardly into the locking groove 26A, 26B. Physical abutment between the terminal wall 86 of the coupling ring and the abutment wall 28A of the locking groove portion 26A prevents detachment between the male and female elements 14, 12A.

An added feature is provided by the threaded arrangement of the portions 13A, 15A of the female element 12A in that the retaining sleeve 13A can be separated from the adapter 15A, enabling disassembly of the connection without removing the adapter 15A from the fluid conduit to which the nipple 19A is connected. In addition, separation of the retaining sleeve 13A from the adapter 15A, exposes the coupling 60 for simplified removal of the retaining sleeve 13A.

The retaining sleeve 13A is easily detached from the adapter 15A since it is capable of rotation relative to the male element 12, the coupling ring 60, and the 15A.

Another advantage of the two-piece female connector element 12A is provided in conjunction with a connector of the type discussed earlier in which the through passage comprises right angle sections, i.e., an L-shaped passage.

Figure 5:
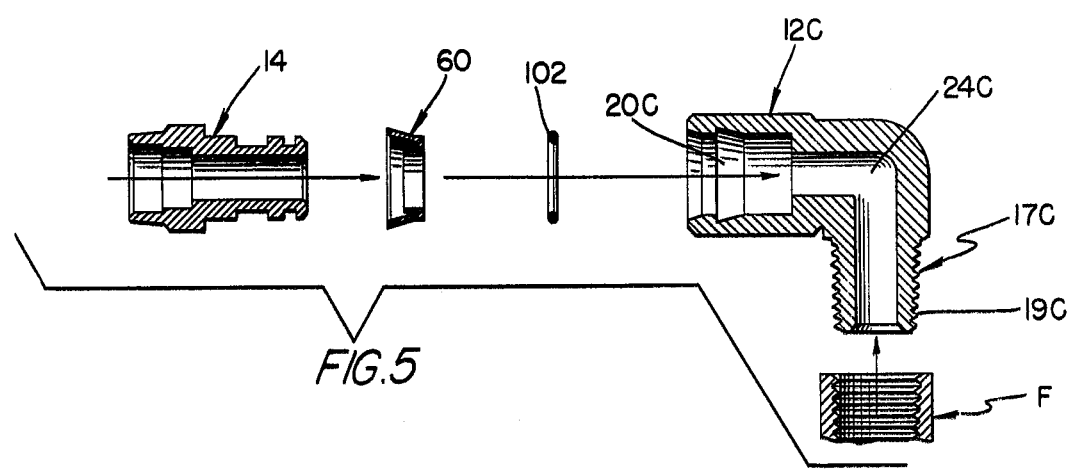
FIG. 5 is a schematic, exploded view of an L-shaped fitting employing a one-piece socket in accordance with FIGS. 1 to 3.
Figure 6:
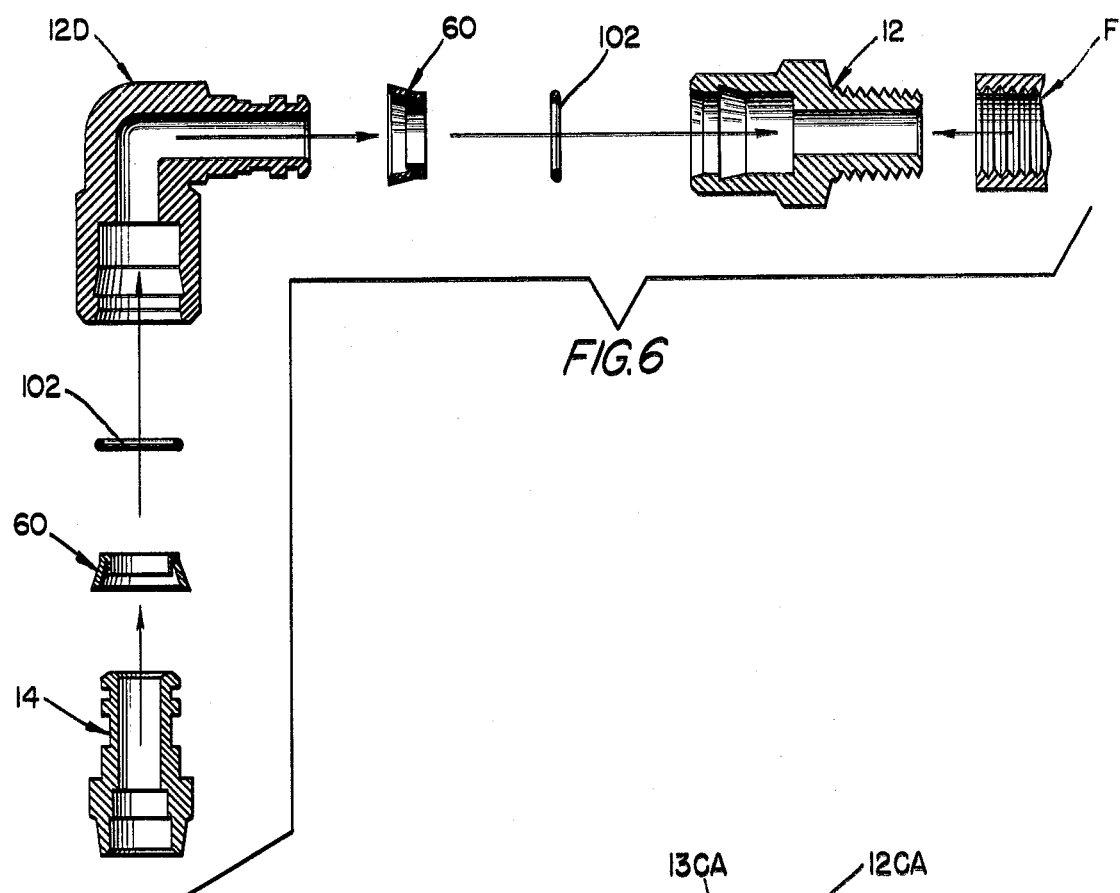
FIG. 6 is a schematic, exploded view of an L-shaped fitting for overcoming a specific shortcoming of the FIG. 5 arrangement.
Figure 7:
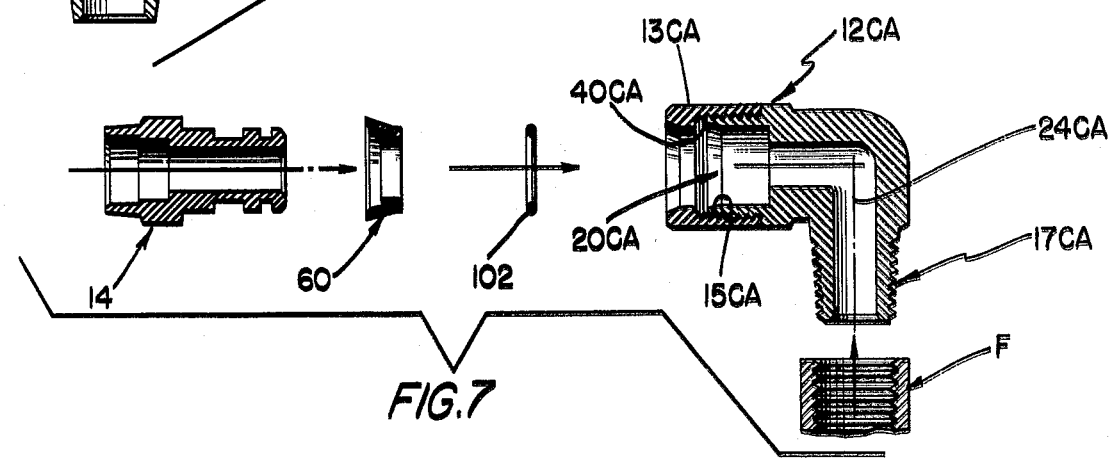
FIG. 7 is a schematic, exploded view of an L-shaped fitting employing a two-piece socket and which overcomes problems associated with the fittings of both FIG. 5 and FIG. 6.

In this regard, reference may be had to FIGS. 5–7. Briefly, FIG. 5 depicts an L-shaped fitting which employs a one-piece integral socket portion of the type described earlier in connection with FIGS. 1 to 3; FIG. 6 depicts an arrangement capable of overcoming a disadvantage of the FIG. 5 structure although involving certain disadvantages of its own; and FIG. 7 depicts a fitting which may be employed in lieu of the FIG. 6 fitting to provide the latter's advantages and eliminate its disadvantages. In FIG. 5 an L-shaped fitting is illustrated which employs a female connector element 12C. This female connector element 12C includes a one-piece integral socket portion 20C and a male connector 17C in the form of a threaded nipple 19C oriented at a right angle relative to one another. A 90°, or L-shaped, through passage 24C extends from one end of the connector element 12C to the other. The nipple 19C is adapted to be secured to a fluid conduit, such as an air inlet F of a vehicle air brake mechanism.

Figure 1:
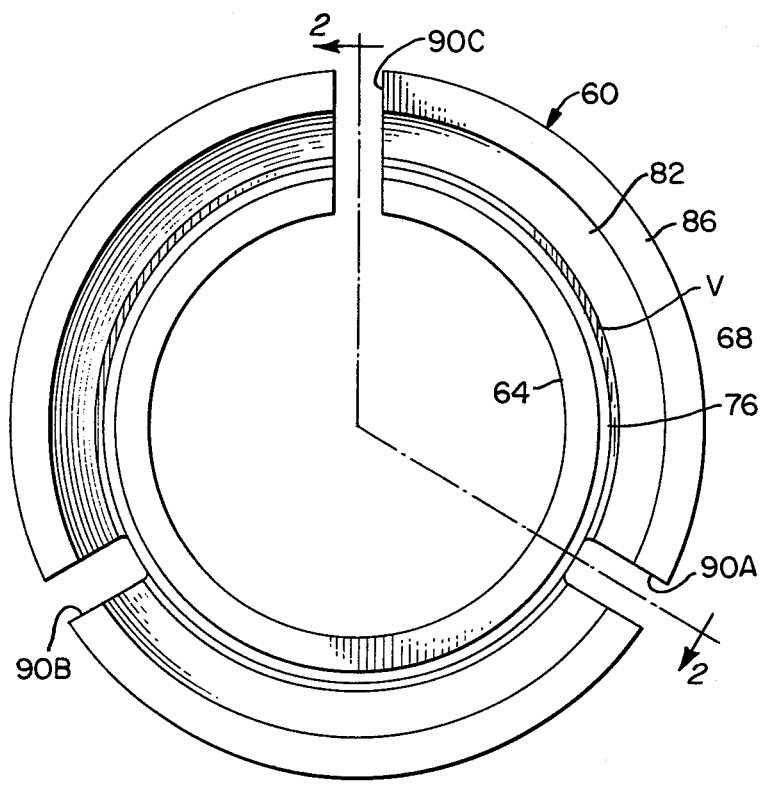
FIG. 1 is a front view of a coupling ring, in its free state, according to the present invention.
Figure 2:
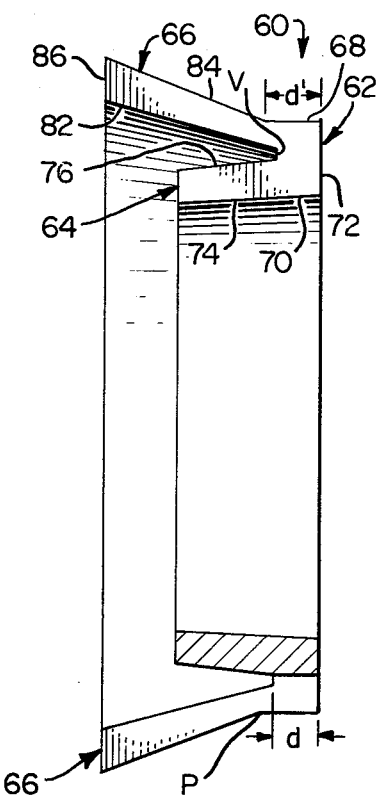
FIG. 2 is a cross-sectional view of the coupling ring taken along line 2—2 of FIG. 1.

The male connector element 14 is securable to the female connector element 12C by a coupling ring 60 in the manner discussed in connection with the embodiment of FIGS. 1 to 3. Since such connection is permanent, however, it is not possible to conveniently remove the nipple 19C from the air inlet F. That is, no appreciable rotation of the female connector element 14C is possible when the male connector element 14 and its conduit (not shown) are connected to the female connector element 12C.

One arrangement which has been proposed in an effort to overcome this shortcoming is depicted in FIG. 6. In this arrangement a female connector element 12D is provided with a male spigot portion 32D which is similar to that of the male connector element 14 in that it receives a coupling ring 60 of a female connector element 12. The latter is connected to the air inlet F and can be easily unscrewed therefrom since the coupling ring 60 permits relative rotation between the female connector elements 12 and 12D. A disadvantage with this arrangement is the need for employing additional parts and the increase in over-all size of the fitting.

These disadvantages can be overcome by utilizing a female connector element which incorporates a feature similar to the two-piece socket arrangement 13A, 15A discussed earlier in connection with FIG. 4.

In this connection, attention is directed to FIG. 7 in which an L-shaped female connector element 12CA is utilized. This connector element 12CA includes an adapter portion 15CA and a removable retaining sleeve 13CA threadedly mountable thereon. The sleeve 13CA and adapter 15CA cooperate to form a socket 20CA and a locking groove 40CA. A 90° through passage 24CA extends through the female element 12CA and communicates with the air inlet F when the element 12CA is connected thereto. A male connector element 14, with its conduit, can be securable within the socket 20CA to complete the connection. Removal of the fitting from the air inlet F can be accomplished by first unscrewing the sleeve 13CA and extracting the male connector element 14 from the socket 20CA. The female connector element 13CA is thus able to be unscrewed from the air inlet F, absent the need for the extra components required by the FIG. 6 structure.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A coupling ring for use in snap-in fittings of the type including male and female connector elements, the male connector element including a ring-retaining channel and the female connector element including a locking groove, said coupling ring comprising:
   an annular base portion including an annular axially extending outer wall, an annular axially extending inner wall spaced radially inwardly from said outer wall, and an annular radial end wall interconnecting adjacent ends of said inner and outer walls;
   an annular collar portion integral with said base portion and extending from a side of said base portion opposite said end wall, said collar portion including an annular, generally frustoconical outer wall and an annular axially extending inner wall spaced radially therefrom;
   said inner wall of said collar portion being contiguous with said inner wall of said base portion;
   said inner wall of said collar portion being adapted to seat in the retaining channel of the male connector element;
   said outer wall of said collar portion being disposed radially inwardly of the plane of said outer wall of said base portion and converging toward said inner wall of said collar portion in a direction away from said base portion; and
   an annular locking portion integral with said base portion and extending from a side thereof opposite said end wall, said locking portion being of longer length than said collar portion and including: an annular generally frustoconical outer wall, an annular generally frustoconical inner wall spaced radially therefrom, and an annular, radial terminal wall interconnecting said inner and outer walls of said locking portion;
   said inner wall of said locking portion extending from said base portion toward said terminal wall at an acute angle relative to said outer wall of said collar portion to form a vertex therewith, said terminal wall adapted to lockingly abut within the locking groove of the female connector element;
   said outer wall of said locking portion being contiguous with, and extending at an angle from, said outer wall of said base portion and being divergent relative to said inner wall of said locking portion in a direction away from said base portion;
   said vertex being disposed closer to said end wall of said base portion than is the place of intersection of said outer walls of said base and locking portions;
   said locking portion including a plurality of circumferentially spaced resiliency slots extending therethrough, one of said slots extending completely through the ring to facilitate mounting thereof on the male connector element.

2. A coupling ring according to claim 1 wherein said inner surfaces of said base and collar portions are aligned to define a cylindrical seating surface of smaller diameter than the diameter of the retaining channel prior to assemblage of said coupling ring therein.

3. A snap-in fitting comprising:
   a female connector element including an axially extending, outwardly open socket;
   said socket having an annular socket-defining wall terminating in an outwardly flared edge at the axially open end of said socket;
   said socket-defining wall including an annular locking groove extending circumferentially therearound, said groove including a generally radial abutment wall at an outer groove end;
   a male connector element including:
   an annular, circumferentially arranged, radially outwardly open retaining channel disposed in oppositely facing relation to said locking groove, when said male and female connector elements are interjoined, said retaining channel including a bottom wall and a radial side wall, said side wall located axially inwardly of said abutment wall of said locking groove; and
   an annular, circumferentially arranged, radially outwardly open recess situated forwardly of said retaining channel;
   an annular sealing ring disposed in said recess and being sealingly engaged against said socket defining wall; and
   a coupling ring retained in said retaining channel for connecting said male and female connector elements together, said coupling ring comprising:
   an annular base portion having an annular axially extending outer wall, an annular axially extending inner wall spaced radially inwardly from said outer wall, and an annular radial end wall, said end wall interconnecting adjacent ends of said inner and outer walls and abutting said side wall of said retaining channel;
   an annular collar portion integral with said base portion and extending from a side of said base portion opposite said end wall, said collar portion having an annular axially extending inner wall and an annular generally frustoconical outer wall spaced radially therefrom;
   said inner wall of said collar portion being contiguous and aligned with said inner wall of said base portion to define therewith a seating surface snugly seated on said bottom wall of said retaining channel;
   said outer wall of said collar portion being disposed radially inwardly of the plane of said outer wall of said base portion and converging toward said seating surface in a direction away from said base portion; and
   an annular locking portion integral with said base portion and extending from a side thereof opposite said end wall, said locking portion being of longer length than said collar portion and including: an annular generally frustoconical inner wall, an annular generally frustoconical outer wall, spaced radially therefrom, and an annular, radial terminal wall interconnecting said inner and outer walls of said locking portion;
   said inner wall of said locking portion extending from said base portion toward said terminal wall at an acute angle relative to said outer wall of said collar portion to form a vertex therewith, said terminal wall disposed in locking abutment with said abutment wall of said locking groove;

said outer wall of said locking portion being contiguous with, and extending at an angle from, said outer wall of said base portion and being divergent relative to said inner wall of said locking portion in a direction away from said base portion;

the distance from said end wall to said vertex being less than the distance from said end wall to the place of intersection of said outer walls of said base and locking portions;

said locking portion including a plurality of circumferentially spaced resiliency slots extending therethrough, one of said slots extending completely through said ring to facilitate mounting thereof on said male connector element.

4. A snap-in fitting according to claim 3 wherein said inner surfaces of said base and collar portions are aligned to define a cylindrical seating surface of smaller diameter than the diameter of said retaining channel prior to assemblage of said coupling ring therein.

5. Apparatus according to claim 3 including an additional connector projecting from said female connector element away from said socket, an additional socket projecting from said male connector away from said female connector element, and a tube coupled to said additional socket.

6. A snap-in fitting according to claim 3 wherein said retaining channel is radially stepped, said collar portion being mounted in a radially inner portion of said channel and said locking portion being received in a radially outer portion of said channel during coupling of said male and female elements.

7. A snap-in fitting according to claim 3 wherein said female connector element includes an adapter portion and a retaining sleeve portion threadedly securable together; said adapter portion and said retaining ring portion each including means cooperating to define said socket and said annular locking groove.

8. A snap-in fitting according to claim 7 wherein said female connector element is of L-shaped configuration and includes a connector portion disposed opposite said socket and extending substantially 90° relative thereto; said connector portion being rotatably connectable to, and detachable from, a fluid conducting structure.

9. A coupling ring for use in snap-in fittings of the type including male and female connector elements, one of said connector elements including a ring-retaining channel and the other of said connector elements including a locking groove; said coupling ring comprising:

an annular base portion including an annular first wall, an annular second wall spaced radially from said first wall, and an annular radial end wall interconnecting adjacent ends of said first and second walls;

an annular collar portion integral with said base portion and extending from a side of said base portion opposite said side end wall, said collar portion including an annular first wall and an annular second wall radially therefrom;

said second wall of said collar portion being continuous with said second wall of said base portion;

said second wall of said collar portion defining a seating surface adapted to seat in the retaining channel;

said first wall of said collar portion being spaced radially from the plane of said first wall of said base portion and converging toward said seating surface in a direction away from said base portion; and an annular locking portion integral with said base portion and extending from a side thereof opposite said end wall, said locking portion being of longer length than said collar portion and including: an annular first wall, an annular second wall spaced radially therefrom, and an annular, radial terminal wall interconnecting said second and first walls of said locking portion;

said second wall of said locking portion extending from said base portion toward said terminal wall at an acute angle relative to said second wall of said collar portion to form a vertex therewith, said terminal wall adapted to lockingly abut within the locking groove;

said first wall of said locking portion being continuous with, and extending at an angle from, said first wall of said base portion and being divergent relative to said second wall of said locking portion in a direction away from said base portion;

said vertex being disposed closer to said end wall of said base portion than is the place of intersection of said first walls of said base and locking portions;

said locking portion including a plurality of circumferentially spaced resiliency slots extending therethrough, one of said slots extending completely through the ring to facilitate mounting thereof on the element carrying said retaining groove.

10. A coupling ring according to claim 9 wherein said first surfaces of said base and collar portions are aligned to define a cylindrical seating surface of smaller diameter than the diameter of the retaining channel prior to assemblage of said coupling ring therein.

11. Apparatus according to claim 9 wherein said female connector element includes an adapter portion and a retaining sleeve portion threadedly securable together; said adapter portion and said retaining ring portion each including means cooperating to define said socket.

12. A coupling ring for use in a snap-in fitting of the type including male and female connector elements, the male connector element including a ring-retaining channel and the female element including an adapter portion and a retaining ring portion releasably securable together; said adapter portion and said retaining sleeve portion cooperating to define a socket having a locking groove, said coupling ring comprising:

an annular base portion including an annular axially extending outer wall, an annular axially extending inner wall spaced radially inwardly from said outer wall, and an annular radial end wall interconnecting adjacent ends of said inner and outer walls;

an annular collar portion integral with said base portion and extending from a side of said base portion opposite said end wall, said collar portion including an annular, generally frustoconical outer wall and an annular axially extending inner wall spaced radially therefrom;

said inner wall of said collar portion being contiguous with said inner wall of said base portion;

said inner wall of said collar portion being adapted to seat in the retaining channel of the male connector element;

said outer wall of said collar portion being disposed radially inwardly of the plane of said outer wall of said base portion and converging toward said inner wall of said collar portion in a direction away from said base portion; and an annular locking portion integral with said base portion and extending from a side thereof opposite said end wall, said locking portion being of longer length than said collar portion and including: an annular generally frustoconical outer wall, an annular generally frustoconical inner wall spaced radially therefrom, and an annular, radial terminal wall interconnecting said inner and outer walls of said locking portion;

said inner wall of said locking portion extending from said base portion toward said terminal wall at an acute angle relative to said outer wall of said collar portion to form a vertex therewith, said terminal wall adapted to lockingly abut within the locking groove of the female connector element;

said outer wall of said locking portion being contiguous with, and extending at an angle from, said outer wall of said base portion and being divergent relative to said inner wall of said locking portion in a direction away from said base portion;

said vertex being disposed closer to said end wall of said base portion than is the place of intersection of said outer walls of said base and locking portions;

said locking portion including a plurality of circumferentially spaced resiliency slots extending therethrough, one of said slots extending completely through the ring to facilitate mounting thereof on the male connector element.

13. In a snap-in fluid conducting fitting of the type in which a male connector element is securable within a socketed female connector element, the male connector element having shoulder means thereon spaced from a retaining channel, said retaining channel carrying a coupling ring which includes a compressible arm that swings into engagement with a groove in the female socket upon merging of the male and female connector elements, to prevent separation of these connector elements, the improvement wherein said female connector element comprises:

an adapter portion comprising: a first connector end adapted for connection with a fluid conductor, and a second end including a first socket portion;

said first socket portion including a first circumferentially extending groove portion including a wall inclined radially outwardly in the direction of the male connector;

a retaining sleeve portion including a second socket portion;

said second socket portion being aligned with said first socket portion to form therewith said socket for receiving said male connector, and including a second groove portion substantially alignable with said first groove portion to define therewith said groove for receiving said compressible arm;

said second groove portion including a generally radial abutment surface engageable with an outer end of said compressible arm to resist disassembly of the fitting said retaining sleeve portion being captured on said male connector element by said coupling ring compressible arm and shoulder means; and means for releasably securing said retaining sleeve portion and said adapter portion together such that said first and second groove portions are aligned to define said groove for receiving said compressible arm, said sleeve and adapter portions being separable to disassemble said fitting and separate said first groove portion from said second groove portion so that said compressible arm, which remains coupled to said second groove portion, is exposed in the direction of separation of said adapter portion to enable the compressible arm to be radially disengaged from said radial abutment surface to allow removal of said sleeve portion from said male connector element.

14. Apparatus according to claim 13 wherein said retaining sleeve includes a flared edge at an end thereof opposite said internal threading, to facilitate entry of said male connector element into said socket.

15. Apparatus according to claim 13 wherein said retaining sleeve includes an inner end which abuts against a stop surface of said adapter; the dimension of said retaining sleeve from said abutment shoulder to said inner end being sized so that with said inner end in contact with said stop surface, said abutment shoulder substantially coincides with said outer end of said compressible arm.

16. Apparatus according to claim 13 wherein said releasable securing means comprises external threading on said adapter portion and internal threading on said retaining sleeve portion.

17. Apparatus according to claim 13 wherein said female connector element is of L-shaped configuration and includes a connector portion disposed opposite said socket and extending substantially 90° relative thereto; said connector portion being rotatably connectable to, and detachable from, a fluid conducting structure.

* * * * *